US008956562B2

(12) United States Patent
Moffatt (10) Patent No.: US 8,956,562 B2
(45) Date of Patent: Feb. 17, 2015

(54) APPARATUS AND METHODS TO MANUFACTURE HIGH DENSITY MAGNETIC MEDIA (75) Inventor: Stephen Moffatt, St. Brelade (JE)

(73) Assignee: Applied Materials, Inc., Santa Clara, CA (US)

( * ) Notice: Subject to any disclaimer, the term of this patent is extended or adjusted under 35 U.S.C. 154(b) by 266 days.

(21) Appl. No.: 13/614,557

(22) Filed: Sep. 13, 2012

(65) Prior Publication Data

US 2013/0062320 A1 Mar. 14, 2013

Related U.S. Application Data (60) Provisional application No. 61/534,539, filed on Sep. 14, 2011.

(51) Int. Cl.
H01F 10/00 (2006.01)
H01F 13/00 (2006.01)
B23K 26/00 (2014.01)
H01F 41/34 (2006.01)
H01F 41/14 (2006.01)

(52) U.S. Cl.
CPC ............... *H01F 41/34* (2013.01); *H01F 13/00* (2013.01); *H01F 41/14* (2013.01); *B23K 26/00* (2013.01); *H01F 10/00* (2013.01)
USPC ............. 264/427; 264/611; 427/555; 438/48; 219/121.77; 219/121.85; 216/22

(58) Field of Classification Search
CPC ......... H01F 10/00; H01F 13/00; H01F 41/00; B23K 26/00
USPC ..................... 264/427, 611; 427/555; 438/48; 219/121.6, 121.77, 121.85; 428/826, 428/836; 360/133, 135; 216/22
See application file for complete search history.

(56) References Cited

U.S. PATENT DOCUMENTS

| 5,953,294 | A | 9/1999 | Choi |
| 6,387,530 | B1 * | 5/2002 | Liu et al. ........................ 428/559 |
| 7,254,150 | B2 * | 8/2007 | Yoshida et al. ............. 372/43.01 |
| 8,105,445 | B2 * | 1/2012 | Klostermann et al. ........ 148/108 |
| 2002/0088770 | A1 | 7/2002 | Damer et al. |
| 2010/0261040 | A1 | 10/2010 | Foad et al. |

OTHER PUBLICATIONS

Aktag, "Direct Laser Interference Patterning of Magnetic Thin Films," The Graduate College at the University of Nebraska, Aug. 2004, 168 pages.

(Continued)

Primary Examiner — Samuel M Heinrich
(74) Attorney, Agent, or Firm — Patterson & Sheridan, LLP (57) ABSTRACT A substrate having a pattern of magnetic properties may be formed by forming a magnetically inactive layer on the substrate, forming a magnetic precursor on the magnetically inactive layer, and forming magnetically active domains separated by magnetically inactive domains in the magnetic precursor by applying thermal energy to the magnetic precursor. The thermal energy may be applied using a laser, which may be pulsed. Forming the magnetically active domains may include crystallizing portions of the magnetic precursor.

15 Claims, 2 Drawing Sheets (56) References Cited

OTHER PUBLICATIONS

Alloyeau, et al., "Flash laser annealing for controlling size and shape of magnetic alloy nanoparticles," Beilstein Journal of Nanotechnology, 2010, pp. 55-59.

Lasagni, et al., "Laser interference metallurgy: A new method for periodic surface microstructure design on multilayered metallic thin films," Applied Surface Science 253, 2006, pp. 8070-8074.

Lasagni, et al., "Production of two-dimensional periodical structures by laser interference irradiation on bi-layered metallic thin films," Applied Surface Science 253, 2006, pp. 1555-1560.

Voisiat, et al., "Picosecond-Laser 4-Beam-Interference Ablation as a Flexible Tool for Thin Film Microstructuring," Physics Procedia 12, 2011, pp. 116-124.

Zheng, et al., "Magnetic nanodot arrays produced by direct laser interference lithography," Applied Physics Letters, vol. 79, No. 16, Oct. 15, 2001, pp. 2606-2609.

* cited by examiner

APPARATUS AND METHODS TO MANUFACTURE HIGH DENSITY MAGNETIC MEDIA

CROSS-REFERENCE TO RELATED APPLICATIONS

This application claims benefit of U.S. Provisional Patent Application Ser. No. 61/534,539, filed Sep. 14, 2011, which is incorporated herein by reference.

FIELD

Embodiments described herein relate to magnetic media manufacturing processes. More specifically, embodiments described herein relate to methods of forming substrates having a pattern of magnetic properties.

BACKGROUND

Hard-disk drives, and other magnetic media, are the storage media of choice for computers and related devices. They are found in most desktop and laptop computers, mobile communication devices, media recorders and players, and instruments for collecting and recording data. Hard-disk drives and other magnetic media are also deployed in arrays for network storage.

Magnetic media store information magnetically. The disk in a hard-disk drive, for example, is configured with magnetic domains that are separately addressable by a magnetic head. The magnetic head moves into proximity with a magnetic domain and alters the magnetic properties of the domain to record information. To read the recorded information, the magnetic head moves into proximity with the domain and detects the magnetic properties of the domain. The magnetic properties of the domain are generally interpreted as corresponding to one of two possible states, the "0" state and the "1" state. In this way, digital information may be recorded on the magnetic medium and read thereafter.

In a magnetic memory device, a magnetically active cell is set to a desired property by exposure to electric current from one or more circuit elements positioned proximate the cell. The cell is typically separated from a magnetically inactive element by a tunnel barrier, and the resistance of electric flow through the cell depends on its state of magnetization. Thus, the state of the cell can be determined by measuring the resistance of electric flow through the cell.

The magnetic medium in a hard-disk drive is generally a glass, composite glass/ceramic, or metal substrate, which is generally non-magnetic, with a magnetically susceptible material deposited thereon. The magnetically susceptible layer is generally deposited to form a pattern, such that the surface of the disk has areas of magnetic susceptibility interspersed with areas of magnetic inactivity. The non-magnetic substrate is usually topographically patterned, and the magnetically susceptible material deposited by spin-coating or electroplating. The disk may then be polished or planarized to expose the non-magnetic boundaries around the magnetic domains. In some cases, the magnetic material is deposited in a patterned way to form magnetic grains or dots separated by a non-magnetic area. In an MRAM device, the magnetically active cells are typically deposited on an insulator, such as glass.

Conventional approaches to creating discrete magnetic and non-magnetic areas on a medium have focused on forming single bit magnetic domains that are completely separate from each other, either by depositing the magnetic domains as separate islands or by removing material from a continuous magnetic film to physically separate the magnetic domains. A substrate may be masked and patterned, and a magnetic material deposited over exposed portions, or the magnetic material may be deposited before masking and patterning, and then etched away in exposed portions. The size of addressable cells that can be formed using such methods is currently limited by the field separation achievable using deposition and/or etching methods. Thus, there is a continuing need for methods of forming substrates having a pattern of magnetic properties resolvable over increasingly small domains.

SUMMARY OF THE INVENTION

A substrate having a pattern of magnetic properties may be formed by forming a magnetically inactive layer on the substrate, forming a magnetic precursor on the magnetically inactive layer, and forming magnetically active domains separated by magnetically inactive domains in the magnetic precursor by applying nanoscopically patterned thermal energy to the magnetic precursor. The thermal energy may be applied using a laser, which may be pulsed. Forming the magnetically active domains may include crystallizing portions of the magnetic precursor.

Alternately, magnetically active domains may be formed in a magnetically inactive material by forming recesses in the magnetically inactive material, filling the recesses with a magnetic precursor, and increasing alignment of atoms in the magnetic precursor by applying energy to the substrate. The recesses may be formed by forming a mask material on the substrate, imprinting the mask material with a pattern defined by thick regions of the mask material and thin regions of the mask material, and etching portions of the magnetically inactive material through the thin regions of the mask material by exposing the mask material to ions having energy selected to penetrate the thin regions of the mask material but not the thick regions of the mask material. The energy applied to the magnetic precursor material may be pulsed laser energy.

In another aspect, magnetically active domains may be formed in a magnetically inactive material by depositing a magnetically inactive layer containing a magnetic precursor on a substrate, nucleating magnetic domains in the magnetically inactive layer from the magnetic precursor by applying a first energy to the substrate, and forming magnetic domains in the magnetically inactive layer by applying a second energy to the substrate. The magnetically inactive layer may be supersaturated with the magnetic precursor material. The first energy, which may be a preheat energy, may be applied through conduction, for example using a heated substrate support, or through irradiation, for example using laser energy, which may be pulsed, while the second energy, which may be an ordering energy, may be applied through irradiation, such as by laser energy, which may be pulsed.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Methods and apparatus described herein form substrates having a pattern of magnetic properties in a surface of the substrate. Such substrates include magnetic storage media such as hard disk drive substrates and memory substrates, such as MRAM wafers.

Substrates that may benefit from methods described herein include glass, semiconductor, and metal substrates. In the hard drive context, a glass or aluminum substrate is often used, and may be blended, mixed, or alloyed with other materials to increase strength or reduce cost. Ceramic particles may be blended into the glass substrate, and other metals may be alloyed with aluminum in some cases.

To form a media having a pattern of magnetic properties, the substrate may be coated with a first layer, which may be non-magnetic or magnetically "soft", that is similar in composition to the magnetic layer to allow a relatively smooth structural transition from the aluminum or glass regime to the magnetic layer. Iron and iron/nickel alloy are examples of such materials. A magnetically active material, such as cobalt/nickel/platinum alloy, is then formed over the first layer. Such layers are commonly formed by deposition processes such as PVD (e.g. sputtering), CVD, PECVD, spin coating, and/or plating.

The magnetically active layer, with the pattern of magnetic properties, is protected and/or smoothed by forming a non-magnetic, non-magnetizable, or less magnetizable cover layer, or a magnetically less active cover layer, over the magnetically active layer. In some embodiments, the cover layer comprises carbon, such as amorphous carbon, crystalline carbon, and/or carbon nitride. In other embodiments, the cover layer may be a tunneling barrier layer, as described above. Metal oxide ceramics such as aluminum oxide, magnesium oxide, and/or iron oxide, including mixed metal oxides, may be used as tunneling barrier layers, and may be deposited over the magnetically active layer. Deposition of the cover layer may be performed by PVD or CVD.

Figure 1:
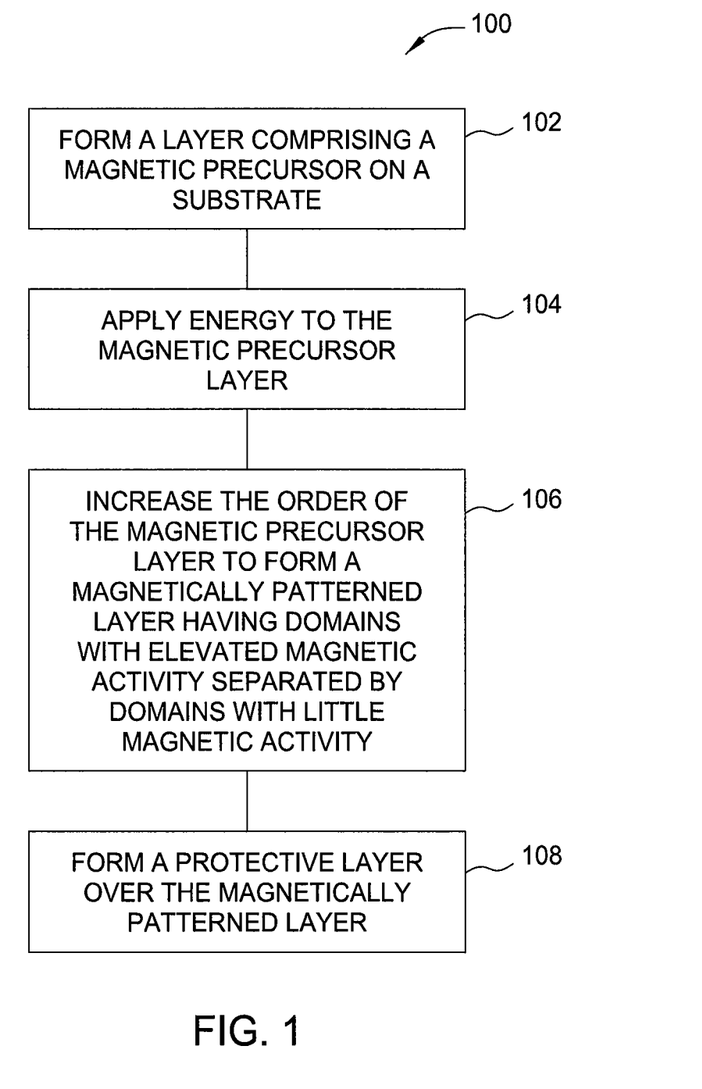
FIG. 1 is a flow diagram summarizing a method according to some embodiments.

FIG. 1 is a flow diagram summarizing a category of methods, exemplified by the method 100. The method 100 may be used to form a substrate having a pattern of magnetic properties distributed across a surface of the substrate. Any of the substrates described above may be treated according to any of the methods of FIG. 1.

At 102, a layer comprising a magnetic precursor is formed on a substrate. The magnetic precursor is typically a material whose magnetic properties are subsequently developed to achieve the magnetic pattern. The magnetic precursor may be non-magnetic or may have an otherwise undifferentiated magnetic structure or property. In one aspect, the magnetic precursor may have an amorphous morphology with random spin axis orientations such that the material displays no magnetism. Such a material may have a low or a high magnetic coercivity with undifferentiated geometry. The layer may be formed by sputtering a target comprising a magnetically active alloy, or by sputtering or co-sputtering targets of substantially pure metals such as cobalt, iron, platinum, and nickel. A layer of magnetic precursor material having a desired mix of metals can be formed in this way to a thickness between about 1 nm and about 100 nm, such as between about 2 nm and about 10 nm, for example about 5 nm.

The layer formed at 102 may be a non-magnetic or magnetically inactive or soft material deposited as a separation medium with the magnetic precursor dispersed within the separation medium. Such a layer may be formed by co-depositing the magnetic precursor material with the separation material. For example, metals such as cobalt, platinum, and nickel may be co-sputtered with glass to form a layer having a solution or dispersion of magnetic precursor material in glass. Ceramics such as metal oxides may also be used. In one aspect, the layer may be formed as a metal-rich ceramic layer by reactive sputtering of metals. By varying the electrical bias on the sputtering targets and the partial pressure of oxygen in the reactive sputtering process, the stoichiometry of the deposited layer may be controlled to produce a ceramic layer supersaturated in magnetic precursor metals. The layer may have a metal content greater than about 55 atomic %, for example up to about 60 atomic % in some cases.

In other modes, the magnetic precursor material may be deposited followed by a non-magnetic, or magnetically inactive or soft, separation medium.

At 104, energy is applied to the magnetic precursor layer to activate motion of atoms in the magnetic precursor layer. A solid-liquid phase change may be induced by the application of energy, or the energy may be less than that required to melt the magnetic precursor material. The energy activates movement of atoms from higher energy states to lower energy states. Ordered phases nucleate as the atoms encounter energy wells and release their potential energy as thermal energy into the rest of the matrix. The ordered phases grow at the expense of the disordered phase because atoms ordered in the crystal matrix are in a lower energy state than atoms in the amorphous or less-ordered phase. Energy is applied until the ordered phases grow to a desired size and separation by the disordered phase.

The energy may be applied by laser in some embodiments. A pulsed laser may be used to deliver between about 10 $mJ/cm^2$ and about 500 $mJ/cm^2$, such as between about 50 $mJ/cm^2$ and about 150 $mJ/cm^2$, for example about 100 $mJ/cm^2$, to the magnetic precursor material. Between 1 and 100 pulses, such as 1-20 pulses, for example 2-10 pulses, are typically delivered to a single treatment area to create the pattern of magnetic domains. Each treatment area may have an area between about 0.1 $cm^2$ and about 10 $cm^2$, and may have any shape, such as circular, elliptical, rectangular, square, polygonal, oblate, oblong, or an irregular shape.

The pulses may be separated by a duration between about 100 psec and about 1 msec, such as between about 1 nsec and about 500 nsec, for example about 100 nsec. Multiple lasers may be used to deliver pulses at a desired frequency and duration. In one embodiment, the pulsed laser is a solid-state laser, such as a frequency-doubled, q-switched Nd:YAG laser operating at about 532 nm wavelength, with electronic timer controlled to change the state of the q-switch in 1 nsec or less to provide tunable pulses of duration between about 5 nsec and about 50 nsec, for example about 25 nsec. An example of a laser apparatus that may be used to practice methods disclosed herein is described in commonly assigned U.S. patent application Ser. No. 13/194,552, filed Jul. 29, 2011.

At 106, the order of the magnetic precursor layer is increased to form a magnetically patterned layer having domains with elevated magnetic activity separated by domains with little magnetic activity. The energy application to the treatment area is continued for a duration that facilitates diffusion of atoms to positions of higher crystal order. In some embodiments, the diffusion may be mediated by a non-magnetic matrix material used to disperse the thermal energy among the magnetic precursor atoms. The non-magnetic matrix may be supersaturated with the magnetic precursor atoms, as described above. In such an embodiment, ordered domains of magnetically active material condense or precipitate from the matrix material with a distribution of sizes and separations that may be Gaussian or quasi-Gaussian. Maintaining the energy application allows the ordered domains to grow, with larger domains growing at the expense of smaller domains.

The applied energy may be selected based on absorption characteristics of the magnetic precursor material and/or the matrix or separation material. Energy that is absorbed by the magnetic precursor material more strongly than by the matrix material may result in asymptotic growth of ordered domains, as absorption of energy by the growing domains increases, offsetting the reduction of energy achieved by atoms joining the ordered domains. Energy that is absorbed more strongly by the matrix material than the magnetic precursor material may grow larger ordered domains, if desired, by encouraging diffusion of the magnetic precursor material through the matrix material. Although the ordered domains of magnetically active material may absorb the energy at a higher rate than the amorphous or dispersed magnetic precursor material, the effect of the energy on the matrix material encourages enough diffusion to support further growth of large domains at the expense of smaller domains.

Metals, including magnetic alloys, are typically reflective, so an anti-reflective coating may be applied to the magnetic precursor layer to reduce the power input needed to process the layer. A material such as silicon dioxide may be used as an anti-reflective coating, and may be formed using any convenient method, including vapor deposition or liquid deposition. In the hard drive context, it is typically useful to provide close proximity between a read head and the magnetic storage media, so thickness of coatings applied to the magnetically active surface of the media are typically minimized. An anti-reflective coating such as silicon dioxide may be formed on the magnetic precursor material prior to thermal processing, and then removed afterward by any convenient means, such as etching according to known processes. Alternately, a very thin layer of silicon dioxide may be applied as an anti-reflective coating and then used as a subsequent protective layer, in addition to any other protective layers that might be applied afterward. In such embodiments, film formation techniques such as atomic layer deposition may be used to form a silicon dioxide film approaching the thickness of a molecular monolayer, for example 20 Å or less. Such a thin silicon dioxide layer will, nonetheless, reduce the incident power needed to accomplish the desired thermal process on the magnetic precursor layer.

At 108, a protective layer or cover layer may be formed over the magnetically patterned layer by sputtering, CVD, or PECVD methods. Carbon or carbon nitride may be deposited by providing a hydrocarbon, such as methane, to a plasma processing chamber. Nitrogen may be added by providing a nitrogen source such as ammonia, nitrogen gas, or hydrazine, to the chamber. Composition of the deposited layer is controlled by the flow rates of the gases to the chamber. Ceramic may be formed by supplying a metal precursor with an oxidizing gas, for example an aluminum alkyl with oxygen, ozone, carbon monoxide. Pressures are typically below about 10 torr and the substrate is maintained at a low temperature, for example less than about 100° C., to avoid disrupting the magnetic pattern. The layer thus formed is typically magnetically less active or inactive, for example non-magnetizable or less magnetizable than the magnetically patterned layer, to allow uninterrupted magnetic manipulation of the magnetically active domains of the magnetically active layer through the cover layer.

In some embodiments, the energy applied in 104 may comprise a first energy and a second energy. The first energy may be applied at a low power, intensity, or fluence to provide nucleation of ordered phase nuclei having dimension less than 100 pm distributed statistically throughout the layer. The first energy may be laser energy, continuous wave or pulsed, with fluence below about 50 mJ/cm$^2$, or by conductive heating, for example by using a resistively heated or conductively heated substrate support. The substrate may be heated, locally by laser, or in bulk by the heated substrate, to a temperature between about 100° C. and about 400° C., for example about 250° C., to foster nucleation. The second energy is typically laser energy, such as that described above in connection with operations 104 and 106, and may be pulsed.

In laser embodiments, a substrate is typically processed by identifying a first treatment area and processing the first treatment area using the laser procedure. A subsequent treatment area is then defined, usually adjacent to the first treatment area, and sometimes overlapping the first treatment area, and the subsequent treatment area is processed using the laser procedure. This process is repeated until all desired treatment areas are processed.

It should be noted that in an embodiment featuring background heating of the substrate with laser reorganization of treatment areas, background heating is maintained at a level that does not disturb the magnetic patterning progressively established on the substrate surface. In some embodiments, the various treatment areas may be spaced apart by up to about 10 nm to avoid thermal disruption of magnetically patterned areas by conduction from a treatment area to a prior treatment area.

In an alternate embodiment, a magnetically patterned layer may be formed by patterning a non-magnetic matrix layer and depositing a magnetic precursor according to the pattern in the non-magnetic matrix layer. The magnetic precursor may then be ordered and activated according to the methods described above. The magnetic precursor deposited in this way is typically deposited as islands having dimension less than about 50 nm, for example between about 1 nm and about 10 nm, such that thermal processing converts the entire island to an ordered magnetically active domain. The magnetic domains thus formed are typically separated the non-magnetic matrix material to form the magnetic pattern.

The patterned deposition of magnetic precursor material may be formed by applying a mask to the non-magnetic layer and patterning the mask by high-resolution means, such as extreme UV lithography or physical imprinting, to form regions with thin mask coverage, or no mask coverage, and regions of thick mask coverage. In a physical imprint context, the mask material may be a carbon-containing material, such as amorphous carbon or a curable polymer material such as an epoxy. The substrate may then be ion-etched using ions with energy insufficient to penetrate the regions of thick mask coverage, but with energy sufficient to etch the non-magnetic layer. The pattern may be etched to a depth between about 1 nm and about 50 nm, such as between about 2 nm and about 20 nm, for example about 5 nm, by controlling the etch time.

The magnetic precursor material may be deposited in the etched features by using a biased sputtering process that penetrates the thin mask regions but not the thick mask regions, or the mask may be removed before deposition, and the substrate planarized to remove deposited material from the field. The thermal treatment may be performed before or after removing the mask material, by selecting energy that can penetrate the mask material or vaporize the mask material. Alternately, the mask material may be substantially transparent to the energy, or the mask material may absorb the energy and convert it to thermal energy for ordering the magnetic precursor material.

In one aspect, a magnetic material may be nanoscopically patterned by subjecting a magnetically susceptible material to nanoscopically patterned thermal energy to create nanoscopic domains having a first magnetic activity separated by nanoscopic domains having a second magnetic activity detectably different from the first activity. The nanoscopically patterned energy may be created by combining energy fields from an intense light source, such as a high-power laser. A beam of light from a high-power laser may be directed toward a beam splitter to form two essentially identical sub-beams. Each sub-beam is then directed toward a beam splitter to form four essentially identical sub-beams. The four sub-beams, created from the incident beam by three beam splitters, are directed toward a spot so the sub-beams overlap at the spot to create a quasi-periodic energy field having local maxima and minima separated by a distance between about 10 nm and about 500 nm, for example between about 20 nm and about 50 nm.

Figure 2:
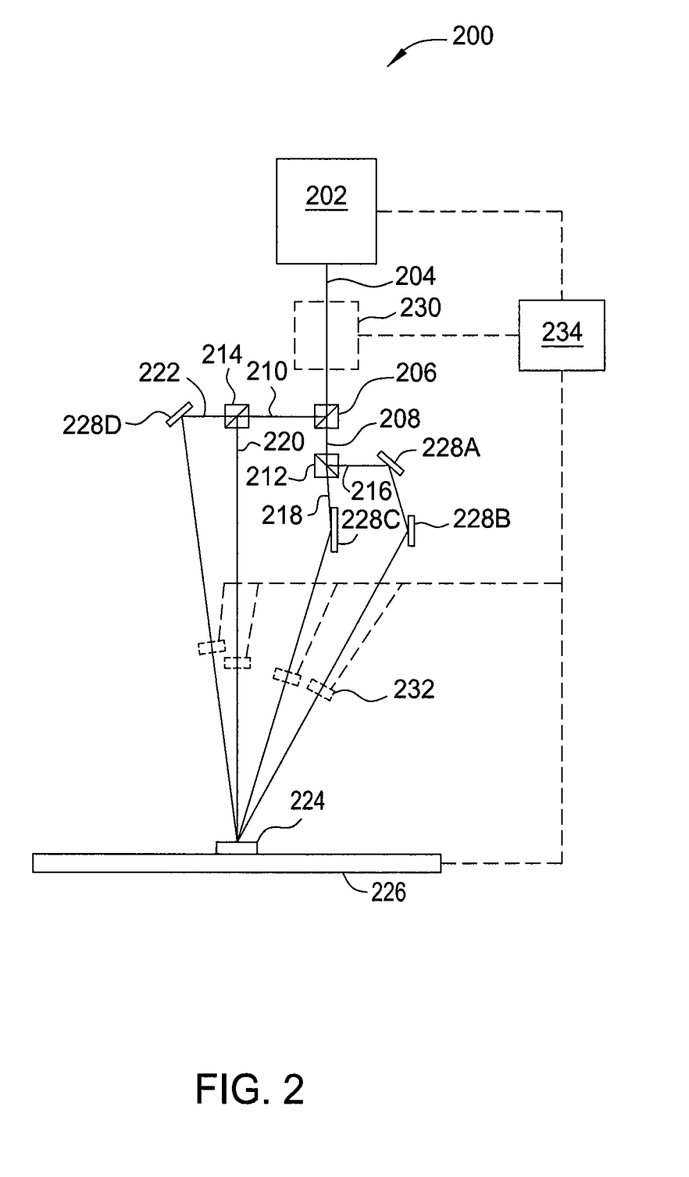
FIG. 2 is a schematic view of a thermal processing apparatus according to another embodiment.

FIG. 2 is a schematic representation of a thermal processing apparatus 200 that uses nanoscopically patterned energy according to one embodiment. The apparatus 200 may be used to practice numerous embodiments of the method 100. A coherent radiation source 202 produces a coherent radiation field 204 directed toward a first beam splitter 206 to form a first sub-beam 208 and a second sub-beam 210. The first sub-beam 208 is directed toward a second beam splitter 212, and the second sub-beam 210 is directed toward a third beam splitter 214. The second beam splitter 212 yields a third sub-beam 216 and a fourth sub-beam 218. The third beam splitter 214 yields a fifth sub-beam 220 and a sixth sub-beam 222. In the embodiment of FIG. 2, the third through sixth sub-beams 216, 218, 220, and 222 are substantially identical to each other in macro-optical properties. The first, second, and third beam splitter may define a pulse divider, which may contain any desired number of beam splitters for forming any desired number of sub-beams.

The four sub-beams 216, 218, 220, and 222 are directed to overlap at a treatment area 224 adjacent to a substrate support 226 on which a substrate would be positioned for processing. Reflectors 228A-D, one for each sub-beam, direct the sub-beams to the treatment area 224. The sub-beams 216, 218, 220, and 222 overlap to produce the nanoscopically patterned energy.

The sub-beams may be polarized, if desired, by polarizing the original coherent radiation 204 using an optional optical system 230. Each sub-beam 216, 218, 220, and 222 may be subjected to an adjustable polarity filter 232, shown in FIG. 2 as optional elements, each of which may be a rotatable wave plate coupled to a rotational actuator, to attenuate each of the sub-beams 216, 218, 220, and 222 individually. The structure of the energy pattern applied to the treatment area 224 may thereby be adjusted.

The energy pattern produced at the treatment area 224 will have a periodicity governed approximately by the angle at which the four sub-beams strike the treatment area 224. Spacing of local energy minima and maxima is affected by the angle of incidence of the sub-beams, a larger angle of incidence generally decreasing periodicity and a smaller angle increasing periodicity. The pattern represents a redistribution of the energy of the original energy field into a quasi-periodic pattern of maximum and minimum energies of the pattern. In the embodiment of FIG. 2, each local energy maximum of the pattern will have a substantially gaussian shape when plotted in three dimensions, resembling a steep hill, the slope of the sides of the hill along a given axis and the spacing between the hills along that axis being affected by the angle of incidence along that axis. The wavelength and intensity of the original radiation cooperates with the angle of incidence to define the height of each hill with respect to the intervening energy valleys between the hills. A shorter wavelength will provide greater resolution of hills and valleys at a given spacing than a longer wavelength. Thus, a nanoscopically patterned energy field may be obtained by splitting a short-wave laser beam into four sub-beams and directing the four sub-beams to a target spot on a substrate support at angles that deviate from normal by a small amount.

Further control over the energy pattern may be afforded by polarizing the original energy and applying adjustable polarity filters to each sub-beam. Adjustable polarity filters, such as rotationally actuated wave plates, may be used to attenuate the sub-beams individually and adjust the shape of the local maxima and minima of the energy pattern. In this way, the energy content and fine structure of the energy pattern applied to the target area 224 may be adjusted to achieve any desired result. Each sub-beam may further be truncated using a typical aperture (not shown) having a desired shape.

Polarizing may also afford improvement in phase contrast for a dithered pattern, as described above. In an embodiment wherein a first pair of sub-beams forms a first energy pattern, a second pair of sub-beams forms a second energy pattern, and the first energy pattern and the second energy pattern are displaced by a quarter-wavelength distance to produce an energy pattern having quarter-wavelength periodicity, polarizing the first pair of sub-beams in a manner orthogonal to the second pair of sub-beams may afford an improvement in contrast between the energy maxima and minima of the resulting energy pattern.

An interference pattern created using four sub-beams split from one original beam, as described above in connection with FIGS. 1 and 2, has an energy density pattern. If the energy density pattern is plotted graphically, areas of high energy, representing the anti-nodes of the interference pattern, resemble hills on the plot separated by valleys of low energy, representing the nodes of the interference pattern. The energy hills typically have a width, from valley to valley, of about $\lambda/2$, so a coherent source of 193 nm radiation could be used to generate an interference pattern with a periodicity of about 95 nm. As further described above, the structure of the energy pattern may be adjusted by changing the angle of incidence of the sub-beams and individually attenuating the sub-beams using rotationally actuated wave plates. Periodicity less than about 200 nm, for example between about 50 nm and about 180 nm, for example about 150 nm, is typically used for most embodiments.

In some embodiments, a pattern of energy hills may be created having a periodicity of $\lambda/4$. Two pairs of sub-beams, as described above, may be targeted to the treatment area 224 with a displacement of $\lambda/4$ such that the pattern created by a first pair of sub-beams and the pattern created by a second pair of sub-beams is displaced by half a period creating an energy pattern having local maxima and minima that repeat at a spatial frequency of one-quarter the wavelength of the radiation. Such techniques tend to reduce the contrast available in the energy pattern, however, and depend on precision targeting of the two patterns.

The energy hills have a roughly Gaussian shape in three dimensions. Near the minimum the rate of energy rise is low, increasing with distance from the minimum to a typically steep slope, then rounding off as the maximum energy locus is approached. Typically, a magnetically susceptible material will start organizing into an ordered material having magnetic activity when exposed to energy of about 10-200 mJ/cm$^2$, for example about 100 mJ/cm$^2$, depending on the composition of the material. Below the characteristic energy threshold of the material, no substantial organization takes place, and above the threshold the material organizes locally while the local density of thermal and radiant energy exceeds the threshold. When the thermal and radiant energy dissipates into the material so the local energy density falls below the threshold, organization stops.

If an interference pattern of periodicity about 95 nm is created with peak energy density that is just above the threshold energy for a material, an area much smaller than the areal coverage of the energy hill is subjected to the threshold energy density, such that a small area of the material is organized into a domain having magnetic activity detectably different from the surrounding material. For example, if the peak energy density of the energy hill is 10% above threshold, and the energy hill has an areal coverage of 9000 nm$^2$ (roughly 95 nm×95 nm), the area of the magnetically susceptible material subjected to threshold energy density may be about 100 nm$^2$. A single pulse of such an energy pattern having duration between about 1 nsec and about 100 nsec may be expected to create partially organized domains of magnetically susceptible material having magnetic activity, for example magnetic coercivity, detectably different from the surrounding material, each domain having a dimension between about 10 nm and about 15 nm. The exact dimensions naturally depend on the capabilities of individual embodiments and detectors. In such an embodiment, the domains would be separated by material having the original magnetic activity, and a distance between the partially organized domains may be between about 60 nm and about 80 nm, roughly reflecting the periodicity of the energy pattern.

Pulsing the energy pattern more than once, for example twice, will grow the size of the partially organized domains, and may increase differentiation in magnetic properties between the partially organized material and the original material for some magnetically active materials. In some embodiments, a second pulse will grow the dimension of the detectably different domains to a dimension between about 20 nm and about 50 nm, reducing separation between the domains to a dimension between about 40 nm and about 60 nm. Typically two to five pulses are delivered to each treatment area.

Using an approach as described above may also enable use of longer wavelength energies, such as a frequency-tripled Nd:YAG laser operating at a wavelength of about 355 nm, with sub-beams arranged at angles of incidence of about 70° to about 85° with respect to the treatment surface and beam energy of the non-divided beam between 50 mJ/cm$^2$ and 100 mJ/cm$^2$. Such a laser may be pulsed to create grain sizes in a typical magnetically susceptible cobalt-platinum material ranging from about 20 nm to about 100 nm, or larger. Other useful laser embodiments include frequency-quadrupled Nd:YAG lasers operating at about 255 nm, and other excimer lasers such as XeF operating at about 351 nm, XeCl operating at about 308 nm, KrF operating at about 248 nm, and other similar lasers.

The optional optical system 230 of FIG. 2 may perform other desired optical transformations before the coherent radiation field 204 interacts with the first beam splitter 206. Such transformations may include uniformization, for example by reprojection through microlens arrays, mode scrambling using etalons, fiber bundles, and/or delay circuits, and/or truncation using apertures. Two beams of coherent radiation may be combined using the optional optical system 230, if desired. Uniformization may be useful in embodiments such as that described above wherein fine control over local energy maxima of the energy pattern applied to the target area is desired.

Beam combining, for example by polarizing two beams orthogonally and directing the two polarized beams to opposite sides of the active surface of a polarizing beam splitter, may be useful in embodiments where high power is desired from two small lasers rather than one large laser. In such embodiments, a combined beam comprising two co-propagating orthogonally polarized beams will interreact with the first beam splitter 206. If the capability to independently attenuate each sub-beam using an adjustable polarity filter is also desired, the first beam splitter may be a polarity filter aligned with the polarity of one or the other of the co-propagating original beams, such that the sub-beam 208 has a polarity orthogonal to the sub-beam 210.

A controller 234 may be coupled to any or all of the energy source 202, the optional optical system 230, the adjustable polarity filters 232 and the substrate support 226 to control delivery and shaping of the energy field applied to the treatment area 224, and to control positioning of successive treatment areas 224 for processing by moving the substrate support 226 on a positioning actuator such as a precision x-y stage (not shown, but known in the art).

While the foregoing is directed to embodiments of the invention, other and further embodiments of the invention may be devised without departing from the basic shape thereof.

What is claimed is:

1. A method of forming a substrate having a pattern of magnetic properties, comprising:
    forming a magnetically inactive layer on the substrate;
    forming a magnetic precursor on the magnetically inactive layer; and
    forming magnetically active domains separated by magnetically inactive domains in the magnetic precursor by applying nanoscopically patterned thermal energy to the magnetic precursor.

2. The method of claim 1, wherein the thermal energy is laser energy.

3. The method of claim 2, wherein the laser energy is pulsed laser energy.

4. The method of claim 1, further comprising forming a non-magnetizable layer over the magnetically active domains.

5. The method of claim 3, wherein the pulsed laser energy has an energy density less than about 10% above a threshold activation energy of the magnetic precursor.

6. The method of claim 5, wherein the nanoscopically patterned thermal energy is applied to the magnetic precursor by sequentially applying the nanoscopically patterned thermal energy to a series of treatment areas.

7. A method of forming magnetically active domains in a magnetically inactive material, comprising:
    forming recesses in the magnetically inactive material;
    depositing a magnetic precursor in the recesses;
    increasing alignment of atoms in the magnetic precursor deposited in the recesses by applying pulsed energy to the substrate.

8. The method of claim 7, wherein the pulsed energy is pulsed laser energy.

9. The method of claim 7, wherein the recesses are formed by forming a mask material on the substrate, imprinting the mask material with a pattern defined by thick regions of the mask material and thin regions of the mask material, and etching portions of the magnetically inactive material through the thin regions of the mask material by exposing the mask material to ions having energy selected to penetrate the thin regions of the mask material but not the thick regions of the mask material.

10. The method of claim 8, wherein the pulsed laser energy is patterned with a periodicity less than about 200 nm.

11. A thermal processing apparatus, comprising:
- a source of coherent energy pulses having duration less than about 50 nsec;
- a pulse divider positioned to receive the coherent energy pulses and emit a plurality of sub-pulses;
- a substrate support positioned to receive the sub-pulses; and
- a plurality of reflectors positioned to direct each of the sub-pulses to overlap at a treatment area adjacent to the substrate support.

12. The thermal processing apparatus of claim 11, further comprising a uniformizing optical system between the source of coherent energy pulses and the pulse divider.

13. The thermal processing apparatus of claim 12, further comprising a plurality of adjustable polarity filters, each adjustable polarity filter positioned along an optical path of one sub-beam.

14. The thermal processing apparatus of claim 11, further comprising a controller in communication with the source of coherent energy pulses and the substrate support.

15. The thermal processing apparatus of claim 13, further comprising a controller in communication with the source of coherent energy pulses, the substrate support, the uniformizing optical system, and the plurality of adjustable polarity filters.

\* \* \* \* \*

UNITED STATES PATENT AND TRADEMARK OFFICE
CERTIFICATE OF CORRECTION

| | |
|---|---|
| PATENT NO. | : 8,956,562 B2 |
| APPLICATION NO. | : 13/614557 |
| DATED | : February 17, 2015 |
| INVENTOR(S) | : Stephen Moffatt |

It is certified that error appears in the above-identified patent and that said Letters Patent is hereby corrected as shown below:

In the Specification

Column 10, Line 29, please delete "shape" and insert -- scope -- therefor.

Signed and Sealed this
Fourteenth Day of July, 2015

Michelle K. Lee
*Director of the United States Patent and Trademark Office*